(12) United States Patent
Ahn

(10) Patent No.: US 8,962,179 B2
(45) Date of Patent: Feb. 24, 2015

(54) SECONDARY BATTERY

(75) Inventor: Chang-Bum Ahn, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 812 days.

(21) Appl. No.: 13/183,334

(22) Filed: Jul. 14, 2011

(65) Prior Publication Data

US 2012/0052372 A1 Mar. 1, 2012

Related U.S. Application Data

(60) Provisional application No. 61/378,345, filed on Aug. 30, 2010.

(51) Int. Cl.
| | |
|---|---|
| *H01M 2/30* | (2006.01) |
| *H01M 2/06* | (2006.01) |
| *H01M 2/16* | (2006.01) |
| *H01M 2/02* | (2006.01) |
| *H01M 10/0565* | (2010.01) |
| *H01M 4/38* | (2006.01) |

(52) U.S. Cl.
USPC ............ 429/179; 429/178; 429/181; 429/246

(58) Field of Classification Search
None
See application file for complete search history.

(56) References Cited

U.S. PATENT DOCUMENTS

| 4,563,403 | A | 1/1986 | Julian |
| 5,943,154 | A * | 8/1999 | Nakayama .................... 359/244 |
| 8,372,543 | B2 | 2/2013 | Kim et al. |
| 2003/0194608 | A1 | 10/2003 | Hirai et al. |
| 2003/0232243 | A1 * | 12/2003 | Hong ............................ 429/161 |
| 2004/0038122 | A1 * | 2/2004 | Hisamitsu et al. ............ 429/120 |
| 2006/0147803 | A1 | 7/2006 | Kim et al. |

(Continued)

FOREIGN PATENT DOCUMENTS

| EP | 0942477 A2 | 9/1999 |
| EP | 1229596 A1 | 8/2002 |
| JP | 63-274054 A | 11/1988 |

(Continued)

OTHER PUBLICATIONS

Extended European Search Report issued by the European Patent Office dated Dec. 30, 2011, 6 pages.

(Continued)

*Primary Examiner* — Alix Eggerding
(74) *Attorney, Agent, or Firm* — Knobbe Martens Olson & Bear LLP

(57) ABSTRACT

Example embodiments relate to a secondary battery which is capable of trapping elution of copper or nickel into ions, the copper and nickel being used as a negative current collector when charging and discharging the battery. The secondary battery according to the example embodiments includes an electrode assembly comprising a positive plate with a positive tab drawn out, a negative plate with a negative tab drawn out, and a separator disposed therebetween; a case to accommodate the electrode assembly and an electrolyte and to be formed with a sealing part; a positive lead tab and a negative lead tab of which one portions are connected to the positive tab and the negative tab, respectively, and another one portions are exposed to the outside of the case; and insulating films attached to one area of the positive lead tab and one area of the negative lead tab, respectively, the areas being in contact with the sealing part of the case, wherein the insulating film attached to the negative lead tab includes a predetermined amount of a nitrile compound.

18 Claims, 4 Drawing Sheets

(56) References Cited

U.S. PATENT DOCUMENTS

2007/0224493 A1* 9/2007 Higuchi et al. .............. 429/130
2011/0217591 A1* 9/2011 Heo ............................ 429/211

FOREIGN PATENT DOCUMENTS

| | | |
|---|---|---|
| JP | 2003-168403 A | 6/2003 |
| JP | 2004-139961 A | 5/2004 |
| JP | 2006-073513 A | 3/2006 |
| JP | 2006-294326 A | 10/2006 |
| JP | 2007-157412 A | 6/2007 |
| JP | 2008-251410 A | 10/2008 |
| JP | 2009-099527 A | 5/2009 |
| KR | 2008-0019311 A | 3/2008 |

OTHER PUBLICATIONS

First Office Action issued by the State Intellectual Property Office of the People's Republic of China on Nov. 20, 2013 in Chinese Application No. 201110252363.0.

* cited by examiner

SECONDARY BATTERY

CROSS-REFERENCE TO RELATED APPLICATIONS

This application claims priority to and the benefit of Provisional Patent Application No. 61/378,345 filed in the U.S. Patent and Trademark Office on Aug. 30, 2010, the entire contents of which are incorporated herein by reference.

BACKGROUND

1. Field

Example embodiments relate to a secondary battery, and more particularly, to a secondary battery which is smoothly charged and discharged.

2. Description of the Related Technology

When charging a secondary battery, an overcharge may occur, and thus various safety components and control circuits are mounted on a charger and a battery to prevent the overcharge. When discharging the secondary battery that is to emit electrons, an overdischarge that is discharging the battery to 0V may occur owing to a low current or a constant resistance. When the overdischarge occurs, a total voltage of the battery becomes close to about 0V, so that metal materials of a negative current collector are oxidized and eluted into metal ions. Accordingly, the battery ages to cause a drastic decrease in capacity of the battery.

SUMMARY

Example embodiments are to provide a secondary battery which is capable of trapping elution of copper or nickel as ions, the copper or nickel being used as a negative current collector when charging and discharging the battery by adding a predetermined amount of a nitrile compound to an insulating film attached to a negative lead tap. Example embodiments are to provide a secondary battery having an element to attach a complex compound generated by reaction of eluted copper ions or nickel ions with a nitrile compound.

According to an aspect of the present embodiments, there is provided a secondary battery including an electrode assembly comprising a positive plate with a positive tab drawn out, a negative plate with a negative tab drawn out, and a separator disposed therebetween; a case to accommodate the electrode assembly and an electrolyte and to be formed with a sealing part; a positive lead tab and a negative lead tab of which one portions are connected to the positive tab and the negative tab, respectively, and another one portions are exposed to the outside of the case; and insulating films attached to one area of the positive lead tab and one area of the negative lead tab, respectively, the areas being in contact with the sealing part of the case, wherein the insulating film attached to the negative lead tab includes a predetermined amount of a nitrile compound.

Here, the insulating film may include 3% to 10% of the nitrile compound.

Further, the electrolyte may include 3% or less of the nitrile compound.

Here, the nitrile compound may be succinonitrile or anisol nitrile.

Further, the electrode assembly may be in a form of a plurality of positive plate, a plurality of negative plates, and a plurality of separators disposed therebetween which are sequentially deposited.

Here, positive tabs drawn out from the positive plates and negative tabs drawn out from the negative plates may be bound in one by welding.

Further, the positive tabs and the negative tabs may be connected with the positive lead tab and the negative lead tab, respectively, by fusing.

Further, the positive tabs and the negative tabs may be fused with the positive lead tab and the negative lead tab, respectively, partly overlapping with each other.

In addition, the insulating film attached to the negative lead tab may extend to an inside of the case and be attached to form a negative tab exposure part to expose the negative tabs fused with the negative lead tab.

Here, a base of the negative plate that is a negative current collector may comprise copper or nickel.

As described above, according to the present embodiments, elution of copper or nickel into ions is trapped, the copper or nickel used as a negative current collector in charging and discharging, and thus despite an overdischarge of a secondary battery, subsequent charging and discharging may be smoothly achieved.

Further, a complex compound generated by reaction of eluted copper ions or nickel ions with a nitrile compound is attached to a negative tab exposure part, thereby preventing generation of byproducts in an electrolyte.

BRIEF DESCRIPTION OF THE DRAWINGS

The accompanying drawings, together with the specification, illustrate example embodiments, and, together with the description, serve to explain the principles of the present embodiments.

DETAILED DESCRIPTION

Example embodiments and other information for those skilled in the art to easily understand the present embodiments are described hereafter in detail with the accompanying drawings. However, the present embodiments may be changed and modified in various ways within the scope described in claims; therefore, it can be understood by those skilled in the art that the embodiment described below are just exemplified.

In charging and discharging operations of a general secondary battery, lithium ions transfer from a positive active material to a negative active material in charging that to provide electrons to a negative electrode of the secondary battery. That is, lithium ions produced from a lithium compound pass though an electrolyte and a separator and then are intercalated in graphite, thereby achieving charging. When charging continues without controlling a charging voltage, a voltage keeps rising accordingly. Thus, various safety components or control circuits are mounted on a charger and an electrode, thereby preventing an overcharge.

In discharging that is to emit electrons through the negative electrode, the lithium ions intercalated into the negative active material transfer to the positive active material. The lithium ions pass through the electrolyte and the separator and are deintercalated from graphite, thereby achieving discharging.

In discharging, a total voltage of the battery becomes a potential difference between a positive electrode and the negative electrode. With a lapse of a discharging time, a voltage in the positive electrode is constant, but a voltage in the negative electrode gradually increases. Thus, there is nearly no potential difference between the positive electrode and the negative electrode, and accordingly the total voltage of the battery decreases. Further, owing to a low current or a constant resistance, an overdischarge that is discharging the battery to 0V occurs.

Accordingly, the total voltage of the battery becomes close to about 0V, so that metal materials of a negative current collector are oxidized and eluted into metal ions. When the metal ions are eluted from the negative current collector, the battery ages and the capacity of the battery is drastically decreased, so that it is difficult to use the battery even if the battery is charged. Therefore, it would be advantageous to prevent in the secondary battery the elution of the metal ions. Hereinafter, an example embodiment is further described with reference to drawings in order to solve such problem.

Figure 1:
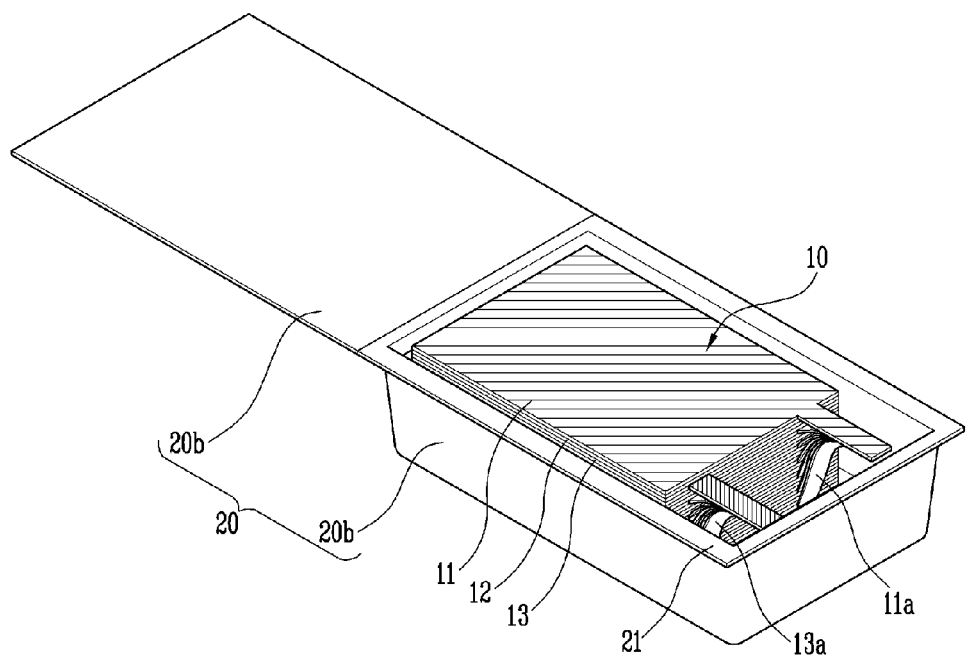
FIG. 1 is a perspective view of an electrode assembly and a case according to an example embodiment.

FIG. 1 is a perspective view of an electrode assembly and a case according to the example embodiment.

Figure 2:
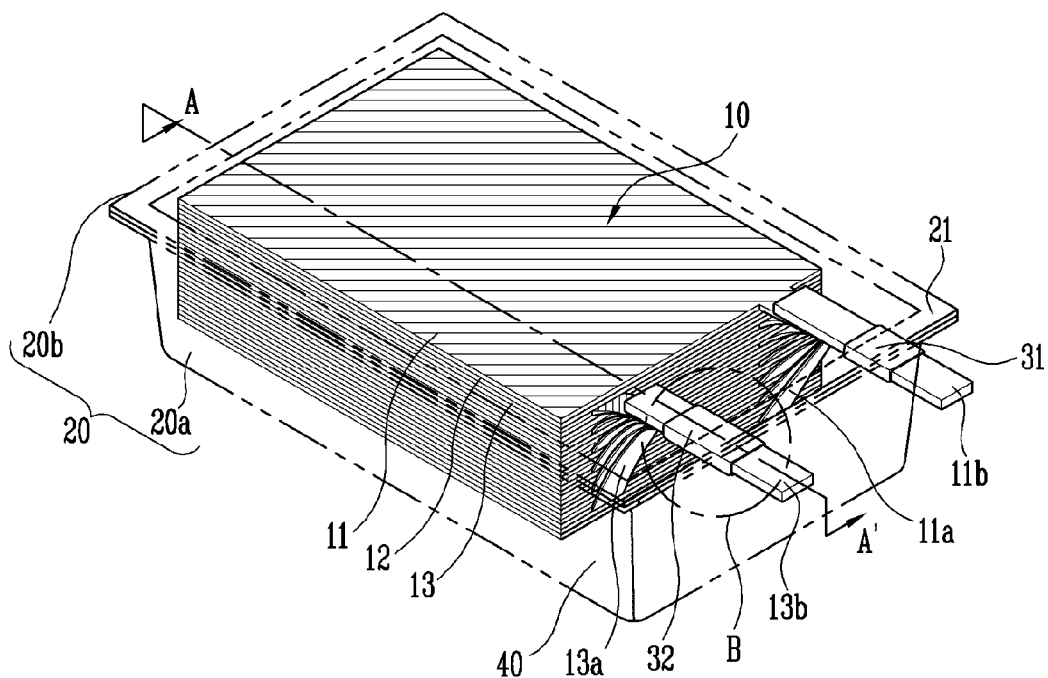
FIG. 2 is a perspective view of a secondary battery according to an example embodiment.

Referring to FIG. 1, the secondary battery according to the embodiment includes the electrode assembly 10 to be charged and discharged and the case 20 to accommodate and seal the electrode assembly 10 and an electrolyte 40 (see FIG. 2). Here, the case 20 may use a pouch.

The case 20 is constituted by an accommodating part 20$a$ and a cover 20$b$, and the accommodating part 20$a$ formed concavely accommodates the electrode assembly 10 inside. Here, the accommodating part 20$a$ may be formed by pressing. The cover 20$b$ is formed to extend from the accommodating part 20$a$ at one end portion. The case may include a sealing part 21 formed along an edge on which the accommodating part 20$a$ and the cover 20 are superposed.

The case 20 may include, for example, steel, stainless steel, aluminum, or equivalents thereof as a base layer. Then, polyethylene terephthalate (PET) or nylon may be coated on one surface of the base layer, and cast polypropylene (CPP) may be coated on another surface of the base layer. However, the case 20 is not limited in materials in the present embodiment.

The electrode assembly 10 may be formed by sequentially depositing a plurality of positive plates 11, a plurality of negative plates 13, and a plurality of separators 12 disposed therebetween, the positive plates 11 and the negative plates 13 having active materials applied thereto. Each positive plate 11 is formed with a positive tab 11$a$ extending from one end of the positive plate 11 and to which an active material is not applied. Each negative plate 13 is formed with a negative tab 13$a$ extending from one end of the negative plate 13 in the same direction as the positive tab 11$a$ and to which an active material is not applied. Here, the positive tabs 11$a$ and the negative tabs 13$a$ deposited may be bound in one by welding.

The positive plate 11 and the negative plate 13 are formed by different processes depending on a type of the secondary battery, but by applying an active material to a current collect of a metal material, followed by drying, roll pressing and cutting.

The positive plate 11 includes a positive current collector having an excellent conductivity and a positive active material layer formed on at least one side of the positive current collector. The positive current collector generally uses aluminum having an excellent conductivity. The positive active material layer is formed by coating a positive slurry which is a mixture of a positive active material, a conductive agent, and a positive binder with a solvent on at least one side of the positive current collector.

Here, the positive active material generates electrons by participating in a positive chemical reaction of a lithium secondary battery, and the conductive agent may transmit the electrons generated from the positive active material to the positive current collector. Also, the positive binder binds the positive active material to the conductive agent to maintain a mechanical strength of the positive plate 11.

The positive active material uses a chalcogenide compound, and examples thereof include complex metal oxides such as $LiCoO_2$, $LiMn_2O_4$, $LiNiO_2$, $LiNi\text{-}xCoxO_2(0<x>1)$ and $LiMnO_2$, but are not limited thereto.

The negative plate 13 includes a negative current collector comprising a conductive thin metal plate, and a negative active material layer coated on at least one side of the negative current collector. The negative active material layer includes a negative active material and a negative binder to bind the negative active material to the negative current collector.

Here, the negative current collector may comprise copper (Cu) or nickel (Ni). The negative active material may generally use one of hard carbon, soft carbon, and graphite, but is not limited thereto in the present embodiment.

Each separator 12 is disposed between the positive plate 11 and the negative plate 13 and uses an insulating thin layer having a high ion transmittance and a high mechanical strength. The separator 12 prevents electric short circuits of the positive electrode and the negative electrode in charging and discharging and enables a transfer of only lithium ions. The separator 12 may be formed to be slightly larger in width and length than the positive plate 11 and the negative plate 13 in order to prevent a short circuit phenomenon on an edge of the positive plate 11 and the negative plate 13.

The separator 12 may comprise a fine porous material to enable a transfer of lithium ions. For example, the separator 12 may comprise polyethylene (PE), polypropylene (PP), polyolefin resin, or equivalent thereof which have a plurality of fine through holes, but not limited thereto. Further, when a solid electrolyte such as polymer is used as the electrolyte 40 (see FIG. 2), the solid electrolyte may also function as the separator 12.

With this configuration, lithium ions in the positive plate 11 transfer to the negative plate 13 in charging, and lithium ions in the negative plate 13 transfers back to the positive plate 11 in discharging. Here, when an overcharge happens, as described above, copper or nickel as negative current collector is eluted in an ion form. The elution of copper ions or nickel ions causes damage to the battery, and accordingly charging and discharging are not properly conducted after the overcharge.

In order to prevent this, a ligand, such as a nitrile compound may be added to the electrolyte 40. For example, the nitrile compound may be succinonitrile or anisol nitrile. The ligand of the present embodiment comprises an ion or molecule that is capable of binding to a central metal atom of at least one of the electrode tabs to form a coordination complex. In some embodiments, the ligand may be a nitrile compound, but is not limited thereto. In some embodiments when the ligand is a nitrile compound, the nitrile compound makes it difficult to elute copper ions or nickel ions. However, the nitrile compound reacts with part of copper ions or nickel ions eluted from the negative current collector to form a complex compound. The complex compound produces byproducts on a surface of the negative plate 13, which may cause lithium ions not to smoothly travel when charging and discharging the battery.

In addition, the nitrile compound elevates a resistance of the positive plate 11. Further, the nitrile compound itself is decomposed to result in generation of gas in the battery. Accordingly, several side effects such as swelling that is expansion of the battery may occur.

Thus, the nitrile compound is needed to prevent the elution of copper ions or nickel ions. As described above, however, the nitrile compound causes various problems to the battery, and a content of the nitrile compound needs to be limited to a predetermined amount or less. In order to additionally control the elution of copper ions and nickel ions from the negative current collector, a secondary battery according to an example embodiment in which a nitrile compound is added in a predetermined amount to an insulating film (insulating film) attached to a negative lead tab is shown in FIGS. 2 to 6.

Figure 3:
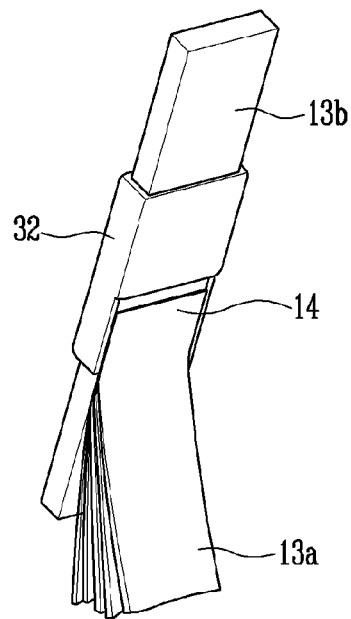
FIG. 3 is a bottom view of a part B in FIG. 2.

FIG. 2 is a perspective view of a secondary battery according to the example embodiment, and FIG. 3 is a bottom view of a part B in FIG. 2.

Referring to FIGS. 2 and 3, the secondary battery according to the present embodiment includes an electrode assembly 10, a case 20, lead tabs 11b and 13b, and insulating films 31 and 32.

The electrode assembly 10 may be formed by sequentially depositing a plurality of positive plates 11 with positive tabs 11a drawn out, a plurality of negative plates 13 with negative tabs 13b drawn out, and a plurality of separators 12 disposed therebetween. Here, the positive tabs 11a and the negative tabs 13a may be bound in one by welding and connected to a positive lead tab 11b and a negative lead tab 13b.

The case 20 may comprise a pouch and accommodates the electrode assembly 10 and an electrolyte 40. The case 20 is formed of an accommodating part 20a and a cover 20b, and a sealing part 21 may be formed along an edge on which the accommodating part 20a and the cover 20 are superposed.

The lead tabs 11b and 13b are constituted by the positive lead tab 11b and the negative lead tab 13b connected to the positive tabs 11a and the negative tabs 13a, respectively. One end portion of the positive lead tab 11b is connected to the positive tabs 11a, and another one end portion thereof is exposed to the outside of the case 20. One end portion of the negative lead tab 13b is connected to the negative tabs 13a, and another one end portion thereof is exposed to the outside of the case 20. Here, the positive tabs 11a and the negative tabs 11a may be fused with the positive lead tab 13a and the negative lead tab 13b, respectively, partly overlapping with each other.

The electrode assembly 10 with the positive lead tab 11a and the negative lead tab 13b fused is accommodated in the accommodating part 20a of the case 20. Then, the electrode assembly 10 is sealed along the sealing part 21 that is the edge of the accommodating part 20a and the cover 20b of the case 20. Here, a thermal adhesive resin (not shown) may be coated on an inside of the case 20 and fused with each other by heating and pressing to seal the electrode assembly 10.

The insulating films 31 and 32 are attached to a portion of the positive lead tab 11b and a portion of negative lead tab 13b, the portions being in contact with the sealing part 21 of the case 20, to enhance sealing of the case 20 and to secure an electrically insulating state. In some embodiments, at least one of the insulating films comprise a ligand capable of forming a complex with is ions of a first metal prior to contact with the electrolyte. In some embodiments, at least one of the insulating films comprises about 3% to about 10% of the ligand. In other embodiments, at least one of the insulating films comprises about 4% to about 6% of the ligand. In some embodiments, the first metal can be at least one of copper or nickel.

The insulating films 31 and 32 comprise a first insulating film 31 attached to the positive lead tab 11b and a second insulating film 32 attached to the negative lead tab 13b. Here, the first insulating film 32 attached to the positive lead tab 11b may be formed only in an area in which the positive lead tab 11b is in contact with the sealing part 21 of the case 20. The second insulating film 32 attached to the negative lead tab 13b may be attached to an area in which the negative lead tab 13b is in contact with the sealing part 21 of the case 20 and an extending area to an inside of the case 20. Here, the second insulating film 32 may be attached with a negative tab exposure part 14 to expose the negative tabs 13a fused with the negative lead tab 13b being formed. For example, the insulating films 31 and 32 may comprise polyimide (PI), polypropylene (PP), polyethylene (PE), or polyethylene terephthalate (PET), but are not limited thereto.

The second insulating film 32 may include a nitrile compound in a predetermined amount. For example the nitrile compound may be included in the tape in the form of a coating. When the second insulating film 32 includes the nitrile compound, elution of copper or nickel used for a negative current collector as ions may be trapped. Accordingly, despite an overcharge of the secondary battery, subsequent charging and discharging may be properly performed.

Here, the extension of the second insulating film 32 to the inside of the case 20 is for securing a space to include the nitrile compound. Complex compounds generated by reaction of eluted copper ions or nickel ions with the nitrile compound may be attached to the negative tab exposure part 14. Thus, byproducts may be prevented from being formed in the electrolyte 40.

In some embodiments, the second insulating film 32 may include from about 3% to about 10% of the nitrile compound. More preferably, the second insulating film 32 may include about 5% of the nitrile compound. Here, the nitrile compound may be succinonitrile or anisol nitrile, but not limited thereto.

When the second insulating film 32 includes less than about 3% of the nitrile compound, it is not effective enough to prevent the elution of copper ions or nickel ions. Further, when the second insulating film 32 includes more than about 10% of the nitrile compound, a resistance increases to deteriorate a concentration or mobility of lithium ions which may be included in the electrolyte 40.

In addition, the electrolyte 40 may further include 3% or less of the nitrile compound. As described above, the nitrile compound included in the electrolyte 40 causes a negative effect which is generation of gas in the battery cell, and thus it is desired to add no more than 3% of the nitrile compound. By providing the ligand to an insulating film attached to one of the electrode lead tabs, it is possible to reduce the amount of ligand in the electrolyte. Hence, the problems associated with have a ligand present in the electrolyte can be minimized. For example, by providing a ligand such as a nitrile compound in an insulating film around the negative lead tab, the ligand is ideally located form complexes with metal ions of the negative lead tab.

Figure 4:
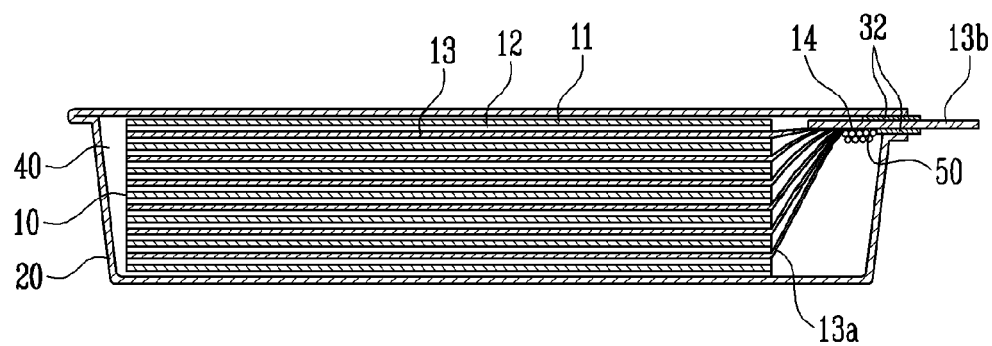
FIG. 4 is a cross-sectional view of a part A in FIG. 2 when discharging the secondary battery according to the example embodiment.
Figure 5:
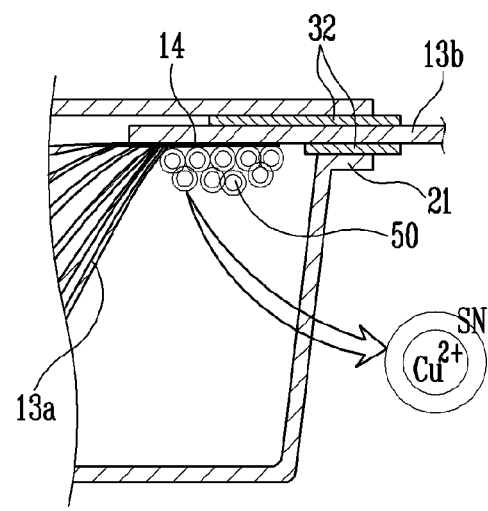
FIG. 5 is a cross-sectional view of a negative tab exposure part of the secondary battery when discharging the secondary battery according to the example embodiment.

FIG. 4 is a cross-sectional view of a part A in FIG. 2 when discharging the secondary battery according to the example embodiment, and FIG. 5 is a cross-sectional view of the negative tab exposure part of the secondary battery according to the example embodiment.

Referring to FIGS. 4 and 5, the second insulating film 32 according to the example embodiment includes a nitrile compound and may be formed with the negative tab exposure part 14. A battery reaction is basically achieved by a reduction potential difference between a positive active material layer and a negative active material layer but may be affected substantially by characteristics of the electrolyte 40 and additives. Thus, the second insulating film 32 including the nitrile compound which makes it difficult to elute copper ions or nickel ions when discharging the battery is formed.

The nitrile compound of the second insulating film 32 produces a complex compound 50 by reacting with part of copper ions or nickel ions eluted from the negative tab exposure part 14. Here, the complex compound 50 may be formed as copper ions or nickel ions capsulated by the nitriled compound. The encapsulated copper ions or nickel ions are attached to the negative tab exposure part 14 to form a film on the negative tab exposure unit 14. Accordingly, the elution of copper ions or nickel ions may be trapped by the film on the negative tab exposure unit 14.

As shown in FIG. 5, when the nitrile compound succinonitrile (SN), and the negative current collector of the negative plate uses copper, the succinonitrile may capsulate copper ions ($Cu^{2+}$). Then, the copper ions capsulated by succinonitrile are attached to the negative tab exposure part 14 to form a physical film, thereby trapping further elution of copper ions.

The electrolyte 40 may include 3% or less of the nitrile compound. Accordingly, it is prevented that part of copper ions or nickel ions eluted from the negative plate 13 to the electrolyte 40 are present in an ion state in the electrolyte 40. The electrolyte 40 may include a minimum amount of the nitrile compound.

Figure 6:
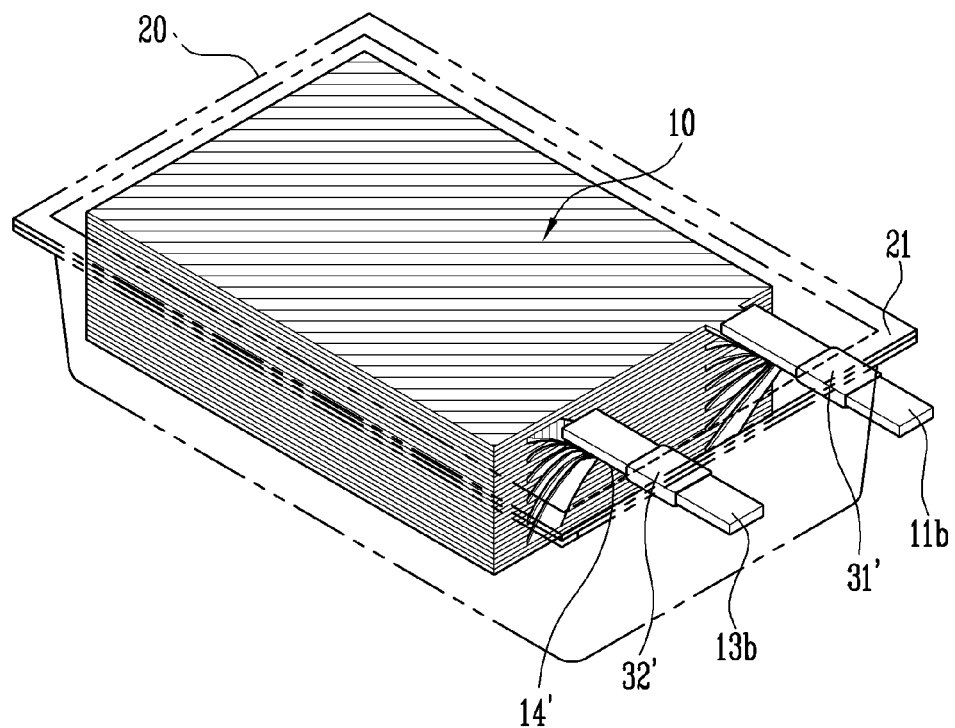
FIG. 6 is a secondary battery according to another example embodiment.

FIG. 6 is a secondary battery according to another example embodiment.

When describing the secondary battery according to the present embodiment with reference to FIG. 6, the same components as those in the foregoing embodiment will not be explained repeatedly.

Referring to FIG. 6, in the secondary battery according to the present embodiment, a first insulating film 31' and a second insulating film 32' have the same shape. That is, the first insulating film 31' attached to a positive lead tab 11b and the second insulating film 32' attached to a negative lead tab 13b may be formed only in an area in contact with a sealing part 21 of a case 20.

In the same manner as in the foregoing embodiment, the second insulating film 32' may include a nitrile compound at a predetermined amount. Accordingly, the nitrile compound may produce a complex compound by reacting with copper ions or nickel ions eluted from a negative tab exposure part 14' when discharging the battery. The complex compound is attached to the negative tab exposure part 14' to form a physical film on the negative tab exposure part 14', thereby preventing the elution of copper ions or nickel ions.

However, the second insulating film 32' in the present embodiment may have a less amount of the nitrile compound than the second insulating film 32 in the foregoing embodiment.

Although the spirit of the present embodiments was described in detail with reference to the preferred embodiments, it should be understood that the embodiments are provided only for explaining the present embodiments and the present embodiments are not limited thereto. Further, it will be understood by those skilled in the art that the present embodiments may be modified in various ways within the scope of the present embodiments.

While the present embodiments have been described in connection with certain example embodiments, it is to be understood that the embodiments are not limited to the disclosed embodiments, but, on the contrary, is intended to cover various modifications and equivalent arrangements included within the spirit and scope of the appended claims, and equivalents thereof.

What is claimed is:

1. A secondary battery comprising:
    an electrode assembly comprising a positive plate with a positive tab, a negative plate with a negative tab, and a separator disposed therebetween;
    a case configured to accommodate the electrode assembly;
    an electrolyte;
    a positive lead tab connected to the positive tab;
    a negative lead tab connected to the negative tab wherein the negative plate comprises a first metal;
    insulating films attached to at least the connected portion of the positive lead tab and the negative lead tab, and
    wherein the insulating film comprises from about 3% to about 10% of a ligand capable of forming a complex with ions of the first metal.

2. The secondary battery of claim 1, wherein the electrolyte comprises about 3% or less of the ligand.

3. The secondary battery of claim 1, wherein the ligand comprises a nitrile compound.

4. The secondary battery of claim 3, wherein the nitrile compound is at least one of succinonitrile and anisol nitrile.

5. The secondary battery of claim 1, wherein the electrode assembly comprises a plurality of positive plates, a plurality of negative plates, and a plurality of separators disposed therebetween which are sequentially deposited.

6. The secondary battery of claim 1, wherein positive tabs drawn out from the positive plates and negative tabs drawn out from the negative plates are bound together by welding.

7. The secondary battery of claim 1, wherein the positive tabs and the negative tabs are connected to the positive lead tab and the negative lead tab, respectively, by fusing.

8. The secondary battery of Claim 1, wherein the positive tabs and the negative tabs are fused with the positive lead tab and the negative lead tab, respectively, partly overlapping with each other.

9. The secondary battery of claim 8, wherein the insulating film attached to the negative lead tab extending to an inside of the case forms a negative tab exposure part which exposes the negative tabs fused with the negative lead tab.

10. The secondary battery of claim 9, wherein the negative tab exposure part comprises the ligand and ions of the first metal.

11. The secondary battery of claim 1, wherein the insulating film attached to the negative lead tab extends to the inside of the case and is attached to form a negative tab exposure part which exposes the negative tabs fused with the negative lead tab.

12. The secondary battery of claim 1, wherein the first metal comprises at least one of copper or nickel.

13. The secondary battery of claim 1, wherein the separator comprises at least one of polyethylene (PE), polypropylene (PP) or polyolefin resin.

14. The secondary battery of claim 1, wherein the electrolyte is a solid electrolyte polymer.

15. The secondary battery of claim 14, wherein the solid electrolyte polymer functions as the separator.

16. The secondary battery of claim 1, wherein the case comprises a sealing part at the edge of the case, and the portions of the positive lead tab and negative lead tab attached to the insulating films are also in contact with the sealing part.

17. The secondary battery of Claim 1, wherein the positive and negative lead tabs are exposed to the outside of the case.

18. The secondary battery of claim 1, wherein the insulating film comprises a complex of the ligand and ions of the first metal.

* * * * *

UNITED STATES PATENT AND TRADEMARK OFFICE
CERTIFICATE OF CORRECTION

| | | |
|---|---|---|
| PATENT NO. | : 8,962,179 B2 | Page 1 of 1 |
| APPLICATION NO. | : 13/183334 | |
| DATED | : February 24, 2015 | |
| INVENTOR(S) | : Chang-Bum Ahn | |

It is certified that error appears in the above-identified patent and that said Letters Patent is hereby corrected as shown below:

Specification

In column 1 at line 62, Change "anisol" to --anisole--.

In column 2 at line 62, Change "though" to --through--.

In column 4 at line 57, Change "anisol" to --anisole--.

In column 6 at line 36 (approx.), Change "anisol" to --anisole--.

In column 7 at line 7, Change "nitriled" to --nitrile--.

Claims

In column 8 at line 21 (approx.), In Claim 4, change "anisol" to --anisole--.

In column 8 at line 32, In Claim 8, change "Claim" to --claim--.

In column 8 at line 61, In Claim 17, change "Claim" to --claim--.

Signed and Sealed this
First Day of December, 2015

Michelle K. Lee
*Director of the United States Patent and Trademark Office*